(12) United States Patent
Zhao et al.

(10) Patent No.: US 11,880,376 B2
(45) Date of Patent: Jan. 23, 2024

(54) REWEIGHTING NETWORK FOR SUBSIDIARY FEATURES IN A PREDICTION NETWORK

(71) Applicant: HULU, LLC, Santa Monica, CA (US)

(72) Inventors: Pengyu Zhao, Beijing (CN); Chunxu Xu, Beijing (CN); Xianghui Mao, Beijing (CN); Xiaohui Xie, Beijing (CN)

(73) Assignee: HULU, LLC, Santa Monica, CA (US)

( * ) Notice: Subject to any disclaimer, the term of this patent is extended or adjusted under 35 U.S.C. 154(b) by 128 days.

(21) Appl. No.: 17/392,928

(22) Filed: Aug. 3, 2021

(65) Prior Publication Data

US 2023/0040419 A1 Feb. 9, 2023

(51) Int. Cl.
*G06F 16/2458* (2019.01)
*G06F 16/9536* (2019.01)
*G06N 7/01* (2023.01)
*G06F 16/735* (2019.01)

(52) U.S. Cl.
CPC ........ *G06F 16/2465* (2019.01); *G06F 16/735* (2019.01); *G06F 16/9536* (2019.01); *G06N 7/01* (2023.01)

(58) Field of Classification Search
None
See application file for complete search history.

(56) References Cited

U.S. PATENT DOCUMENTS

| | | | | |
|---|---|---|---|---|
| 11,481,438 | B2 * | 10/2022 | Deng | ........................ G06N 3/04 |
| 2018/0352091 | A1 * | 12/2018 | Puri | ..................... H04M 7/0036 |
| 2019/0258741 | A1 * | 8/2019 | Chen | ................... G06F 16/9536 |
| 2019/0325293 | A1 * | 10/2019 | Wang | ....................... G06N 20/20 |
| 2020/0193288 | A1 * | 6/2020 | Li | ...................... G06F 16/24575 |

OTHER PUBLICATIONS

Kaiming He, et al., "Deep Residual Learning for Image Recognition", Microsoft Research, https://arxiv.org/pdf/1512.03385.pdf; 12 pages, Dec. 10, 2015.

* cited by examiner

*Primary Examiner* — Giuseppi Giuliani
(74) *Attorney, Agent, or Firm* — Kwan & Olynick LLP (57) ABSTRACT

In some embodiments, a method receives a sequence of subsidiary features that are associated with a sequence of main features. A subsidiary feature provides subsidiary information for a main feature. A sequence of first weights for the sequence of subsidiary features is generates where a first weight in the sequence of first weights is generated based on a respective subsidiary feature. The method processes the sequence of first weights to generate a sequence of second weights. The processing uses relationships in the sequence of first weights to generate values of the second weights. The method uses the sequence of second weights to process the sequence of main features to generate an output for the sequence of main features.

20 Claims, 8 Drawing Sheets

REWEIGHTING NETWORK FOR SUBSIDIARY FEATURES IN A PREDICTION NETWORK

BACKGROUND

A recommendation system may generate recommendations for a user account of a video delivery system. For example, the system may recommend videos while the user account is using the system online. The speed of generating the recommendations and quality of the recommendations may be important for the performance of the video delivery system. For example, the recommendations need to be generated within an acceptable time period to be displayed in the interface. Also, the recommendations should be high quality recommendations that may be relevant to the interests of users of the user account such that the recommendations may be more likely to be selected for playback. Accordingly, the hours that are spent using the video delivery system may increase as a user of the user account may find more relevant videos to watch.

The recommendation system may analyze behavior on the video delivery system to generate the recommendations. The behavior may include information that is related to a sequence of behavior from the user account. For example, a watch history of videos may be a sequence of behavior. However, to analyze the sequence of behavior, complex neural networks are typically used to capture sequence level relationships of the user behavior. The use of the complex neural networks may be inefficient and use a lot of computing resources. When operating in an online environment in which recommendations should be generated in real time (e.g., within a short time period) while a user account is browsing the user interface, using the complex neural networks may not be possible.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a prediction network. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system, such as a video delivery system, generates recommendations for user accounts in a live online environment. The recommendations may recommend content, such as videos, that may be considered relevant to the user accounts. A recommendation engine may use input that is associated with the user account, such as user behavior on the video delivery system, to generate the recommendations. The user behavior may include behavior that can be organized sequentially over time, such as a user watch history of content that occurred at different times.

In some embodiments, a subsidiary intensity (SIN) aggregator may use subsidiary features to capture fine-grain interests associated with the user behavior. In general, the aggregator may receive an input of a sequence of user behavior, and generate an output that represents the sequence, which is typically a fixed size. For example, the aggregator may use a pooling operation to combine the sequence of inputs into the output. The aggregator may apply weights to respective inputs in the sequence to emphasize more important behaviors in the sequence more than less important behaviors.

The subsidiary interests may describe a behavior in more detail, such as a number of times a video was watched by a user account. The recommendation system uses subsidiary features to generate original weights on each respective input in the sequence of inputs. Previously, the aggregator may have previously only used point-wise weights, which generated an intensity of a weight for a subsidiary feature only based on that feature. This neglected sequence-wise relationships, such as user account interests that can be based upon the sequence of subsidiary features or the sequence of inputs. While the subsidiary features can be analyzed using complex neural networks to capture the sequence-wise relationships, the use of complex neural networks is computationally expensive and may not be able to meet the requirements of generating recommendations for an online environment. As will be discussed in more detail, to overcome the disadvantages, the aggregator may use a reweight network that can characterize the sequence-wise relationships of the original weights to generate reweight values. Then, the aggregator may use the original weights and/or sequence-wise reweight values to analyze the sequence of inputs.

System Overview

Figure 1:
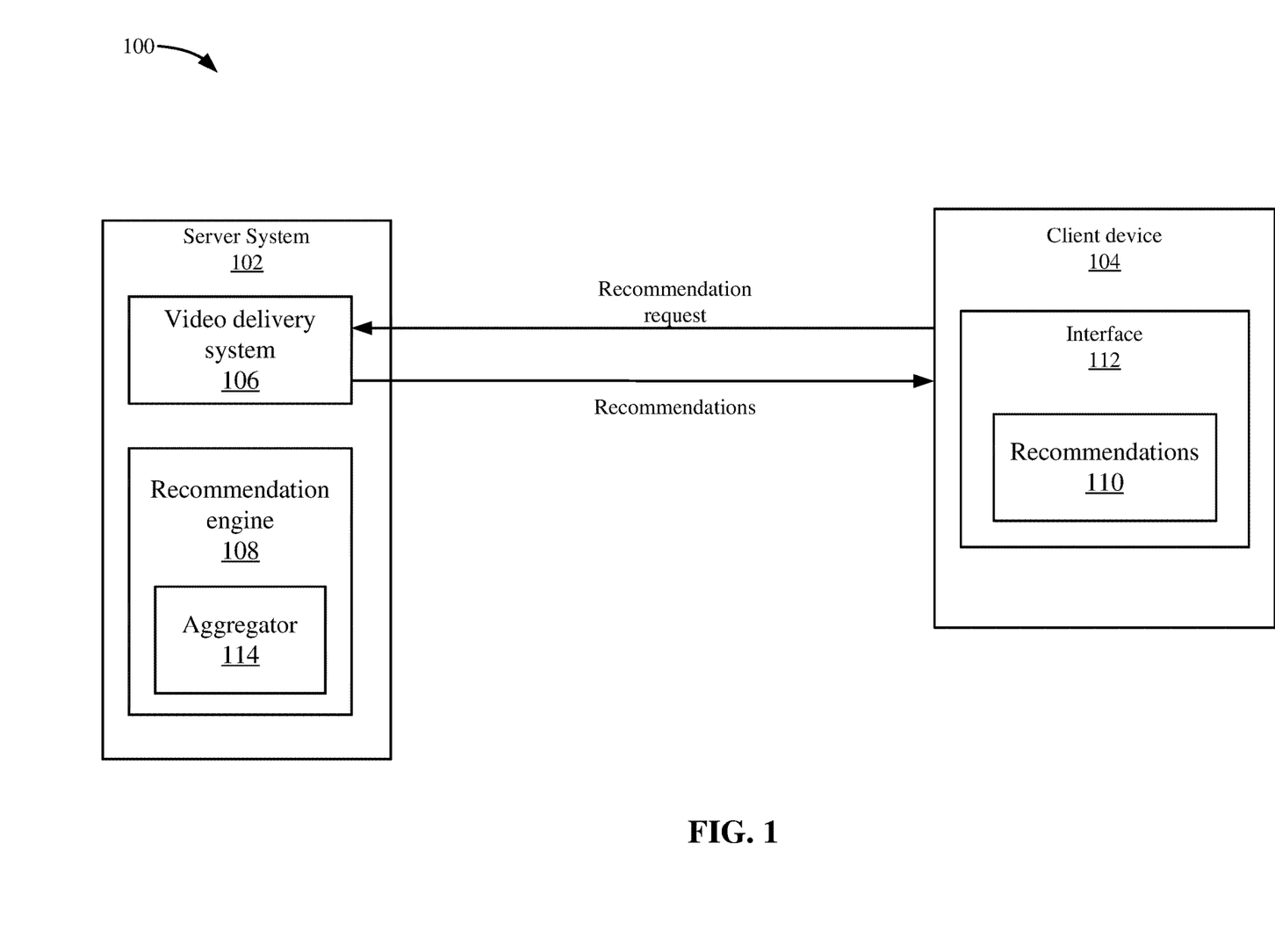
FIG. 1 depicts a simplified system for providing recommendations according to some embodiments.

FIG. 1 depicts a simplified system 100 for providing recommendations according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be content that is requested by a user account associated with client device 104. For example, a user account may request a movie, an episode of a show, etc. Although videos are described, it will be understood that other content may also be delivered, such as a website, page of content, etc.

Client device 104 may be a computing device, such as a smartphone, living room device, personal computer, tablet, television, set-top box, etc. Client device 104 may include an interface 112 that may display content, such as a library of videos may be recommended for browsing. Also, a media player may play back a video that is requested from video delivery system 106. A user account may use client device 104 and may be associated with video delivery system 106 (e.g., the user account signs up for the service). A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Interface 112 may display recommendations at 110. The recommendations may recommend different kinds of content. For example, the content may be videos offered by video delivery system 106. However, other recommendations may be appreciated, such as display advertisements, non-video content, such as webpages, etc.

Video delivery system 106 may receive a request for recommendations from client 104. Then, video delivery system 106 should provide the recommendations back to client 104 for display on interface 112 within a certain amount of time, such as a time defined by a threshold. Generally, in an online environment, the time to generate the recommendations is very short and recommendations should be generated in a time taken to generate a display of the interface, which may include information other than the recommendations.

A recommendation engine 108 may generate the recommendations. For example, the recommendations may be for content offered by video delivery system 106, such as videos. In some embodiments, video delivery system 106 may provide an interface that may display items that are ranked on interface 112. For example, items may be organized by collections, such as television, movies, etc. Recommendation engine 108 may rank items for the respective collections. Then, the items may be displayed as recommendations at 110 on interface 112. Selections from the user account may be received, such as a selection of a video for playback.

Recommendation engine 108 includes an aggregator 114 that may analyze a sequence of inputs to generate an output representation of the input. The input may be information about the user account, such as user behavior on video delivery system 106. Some examples of user behavior include which videos are selected or watched by the user account, or other actions taken on video delivery system 106. Each behavior in the sequence may be represented by an embedding, which may be a value in a space. The input may be other actions taken by the user account, such as which details of a video are viewed.

Conventionally, sum pooling or a weighted sum may be used to generate the output representation of the sequence of inputs. Sum pooling may add representations of the sequence together to generate the output representation. If an embedding represents each behavior, the embeddings may be added together. Also, a weighted sum may apply weights to respective embeddings. The intensity of the weights may be determined using different methods. The "intensity" may be a value that represents a relevance of the behavior to the user account, such as a higher intensity value represents a higher relevance, and a lower intensity value represents a lower relevance. Accordingly, behaviors in a sequence that are considered more relevant to the user account should be weighted higher than behaviors that are considered less relevant to the user account.

As will be discussed in more detail below, aggregator 114 may leverage subsidiary features when analyzing the sequence of inputs. For example, the input may be a sequence of user behaviors and each user behavior may have subsidiary features. A subsidiary feature may describe more information about a respective behavior. For example, for a video that a user account watched, some subsidiary features may be a watch count, an engage time, watch count on the series, watch minutes on a show, last watch time until present, release date, etc. The watch count may be how many times a user account watched the video. The user watch count on a series may be how many times the user account has watched the series associated with the video (e.g., a show may be a series of related episodes). The watch minutes on a show may be how many minutes the user account has watched the show. The last watch time until present may be the last time a user account watched the show or specific video. The release date may be the release date of the episode on a network or on video delivery system 106. Although these subsidiary features are described, other subsidiary features may be appreciated.

Aggregator 114 may use the subsidiary features to generate different weights (e.g., different intensities) for respective inputs in the sequence of inputs. For example, for each behavior in the sequence of inputs, aggregator 114 uses corresponding subsidiary features to generate a respective original weight for the behavior. For example, aggregator 114 may use a prediction network to generate original weight values. These original weight values may only be based on each individual behavior and use information separate from the other behaviors in the sequence of input. That is, the original weight values may be point-wise weights in that they do not consider other features, such as other subsidiary features or the original input of user behavior. Instead of just using the original weight values, aggregator 114 may use a reweight prediction network to generate reweight values for original weights. The reweight prediction network may consider the sequence of original weights to generate the reweight values. Because the original input and subsidiary features are sequential, generating reweight values based on the sequential relationship between the original weights improves the performance of aggregator 114 to generate more relevant recommendations. The improvement may be based on using relationships that are determined from the sequence of original weights to generate reweight values. Also, using a reweight prediction network may include logic that has less complexity compared to if the subsidiary features are analyzed. That is, the subsidiary features may be longer in value and may have been multiple dimensions. Also, the subsidiary features may be embeddings within a space where the range of possible values is very large. However, the weight values may be only a single dimension and within a limited range (e.g., 0-5). Analyzing the original weight values may be less complicated than the possible values for subsidiary features, which allows aggregator 114 to generate recommendations faster. After generating the reweight values, aggregator 114 may use the original weights and reweight values to generate the output representation.

The following will now describe a general recommendation process that may be used, but other processes may be appreciated. Then, the subsidiary feature analysis will be described in more detail.

Recommendation Engine

Figure 2:
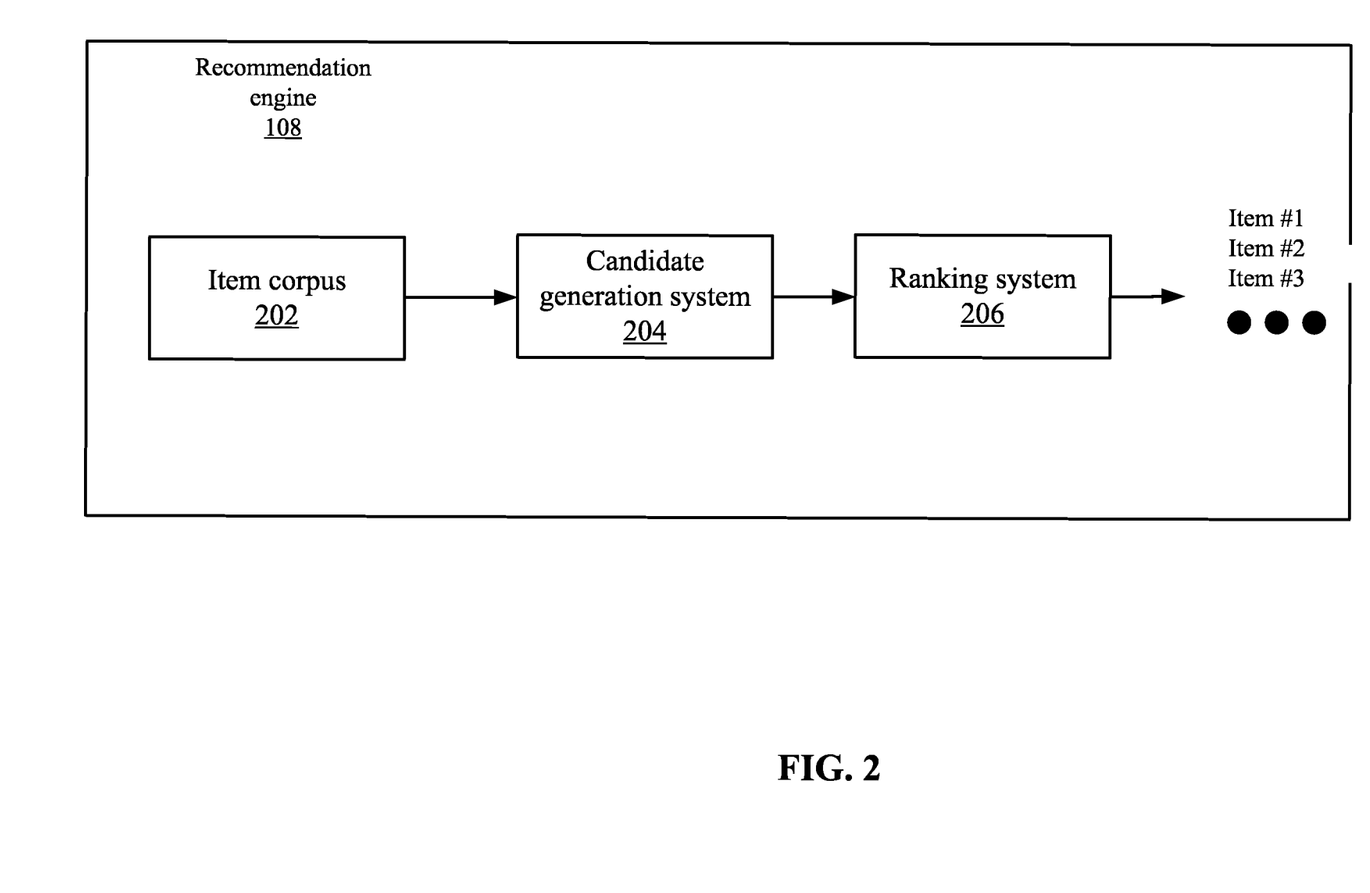
FIG. 2 depicts a more detailed example of a recommendation engine according to some embodiments.

FIG. 2 depicts a more detailed example of recommendation engine 108 according to some embodiments. Recommendation engine 108 includes an item corpus 202, candidate generation system 204 and a ranking system 206. Item corpus may include items that are eligible to be recommended. For example, item corpus 202 may include any item of video delivery system 106 that can be recommended, such as any videos that may be played back by a user account.

Candidate generation system 204 may generate candidates from item corpus 202. For example, item corpus 202 may include a large number of items, and ranking all of those items may be inefficient especially in an online environment where there is a limit in time that can be used to generate recommendations. For example, interface 112 may send a request for items and recommendation engine 108 has a limited amount of time to generate the recommendations to display in interface 112 in real-time (e.g., within a threshold). Accordingly, candidate generation system 204 may retrieve a portion of the items in item corpus 202 to reduce the time needed to rank the items. Candidate generation system 204 may use a model that selects some of the items that a user account might be interested in, such as for a collection. For example, candidate generation system 204 may select 200 movies that are candidates to recommend to a user account.

A ranking system 206 ranks the items that were retrieved by candidate generation system 204. Ranking system 206 may use a model to predict a relevance, such as a probability, for the items to characteristics of the user account. For example, ranking system 206 may generate a click probability of the items for the user account. The probability may represent a probability that the user account will select each respective item. Ranking system 206 may order the items by the predicted probability in the ranking. Then, video delivery system 106 may output at least a portion of the items in the ranking.

In some embodiments, the subsidiary feature analysis that is described herein may be used in candidate generation system 204 and/or ranking system 206. Although the prediction network in candidate generation system 204 and/or ranking system 206 may include different components, candidate generation system 204 and/or ranking system 206 may include a subsidiary feature analysis as described herein.

Main Model Example

Figure 3:
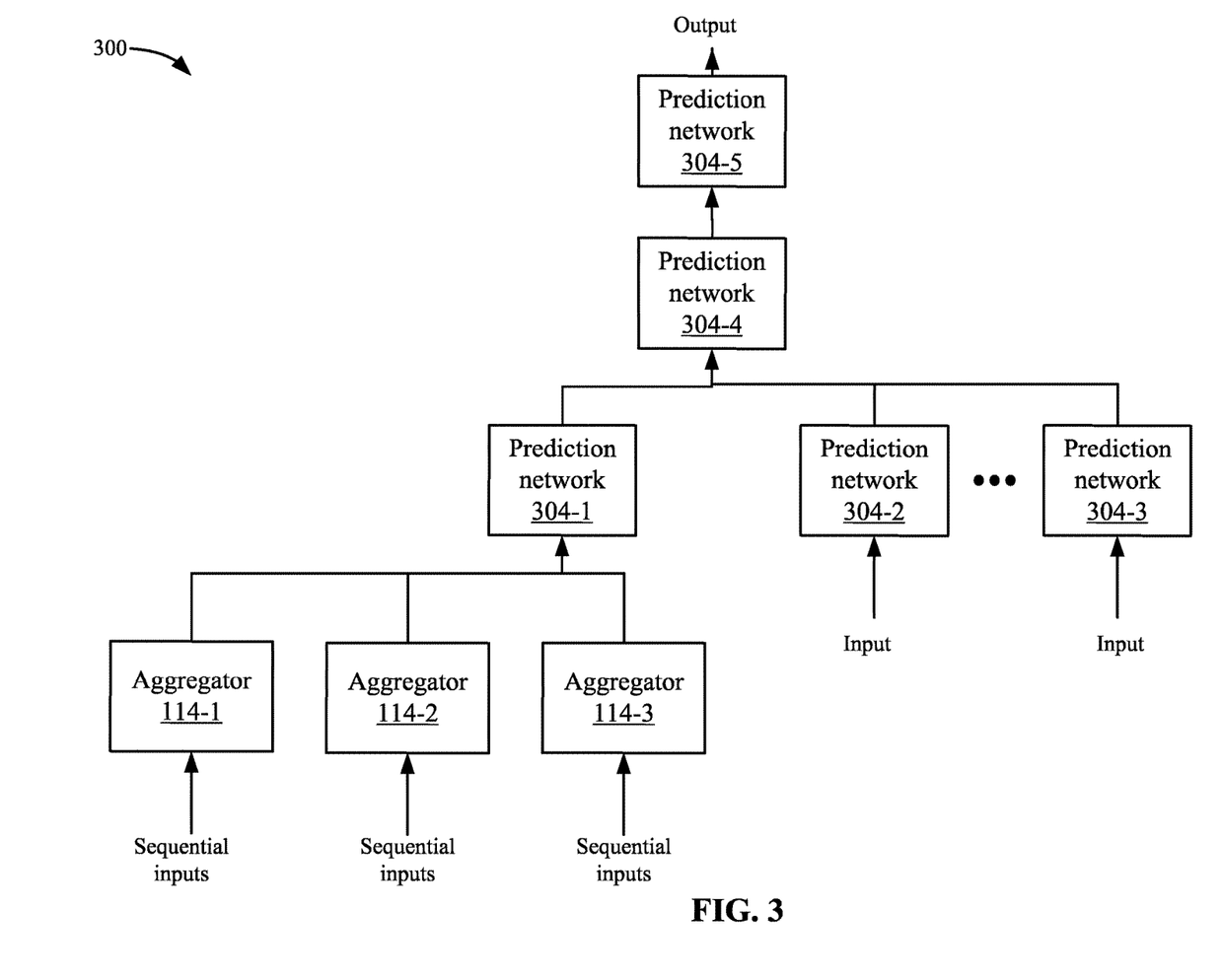
FIG. 3 depicts an example of a main model that can be used to generate recommendations according to some embodiments.

FIG. 3 depicts an example of a main model 300 that can be used to generate recommendations according to some embodiments. Main model 300 may be a series of components (e.g., sub-models or other processes) that interact to generate an overall output. As discussed above, the overall output may be a relevance of an item that measures how relevant the item is to the input. Recommendation engine 108 may perform an analysis of multiple items separately to generate the respective output, such as a selection probability, for each item. In total, main model 300 may generate selection probabilities for multiple items based on input. Although the following structure of main model 300 is described, it will be understood that main model 300 may include different configurations of components.

The different components may analyze different information to generate an output, where outputs of components are used to generate the overall output. In some embodiments, different components may include sub-models that analyze different types of inputs. Also, components may analyze the output of other components. In some embodiments, aggregators 114-1 to 114-3 may analyze sequential inputs to generate a representation of the input. In some embodiments, aggregators 114 aggregates the sequential inputs into a fixed-size (usually a single) feature. Although three aggregators 114 are described, different numbers of aggregators may be appreciated.

The sequential inputs may be inputs that are organized based on time. For example, a history of user behavior over time may be input as the sequential inputs. In some embodiments, the sequential inputs may be based on a history of content that has been classified as being interacted with by user accounts, such as content has been watched or content has an impression but is not watched. The watched behavior may be based on a user account playing back a certain amount of a video above a threshold. An impression, but not watched behavior may be when a user account may have interacted with a video, but not played the video, such as reviewed details about the video. Different user behaviors for the sequential inputs may be appreciated.

Aggregators 114 may receive different sequential inputs and extract features, such as user interests, from the sequential inputs. Aggregators 114 may extract user interests from the watch history that may reflect the latent patterns in the sequential inputs. For example, aggregator 114 may investigate the sequential relationship of the inputs to compress the sequential inputs into a representation that represent the interests found in the watch history. The output may be a fixed length representation of the sequential inputs where the output is smaller than the sequential inputs. For example, a sequence of embeddings is reduced to a single embedding that represents the sequence.

Main model 300 may also include other prediction networks 304-1 to 304-5. As shown, prediction network 304-1 may receive input from aggregators 302-1 to 302-3. Also, prediction networks 304-2 to 304-3 may receive input for the user account. The input may include sequential inputs or other input that may not be sequential, such as a user account age, gender, time information, location information, etc. The output of prediction networks 304-1, 304-2, and 304-3 are input into a prediction network 304-4, which can combine the inputs. Then, prediction network 304-5 may generate an output. As discussed above, although the configuration of components of main model 300 are described, it will be understood that different configurations may be appreciated.

Aggregators 114 may include a sub-model that receives the sequential inputs. As shown, the output of aggregators 114 may be input through other components, such as prediction networks 304, until the output is generated. Each prediction network 304 may also include a sub-model that analyzes the inputs and generates an output. As the information flows upward from the initial inputs to the output, the amount of information that is analyzed may become more focused. That is, aggregator 114 may receive a full array of sequential inputs. The output of aggregator 114 may be a more focused representation that represents the sequential inputs. Then, another prediction network 304 may analyze the more focused representation to generate an even more focused representation. This process continues until the overall output is generated.

Now, the subsidiary feature analysis in an aggregator 114 will now be described.

Subsidiary Feature Analysis

Figure 4:
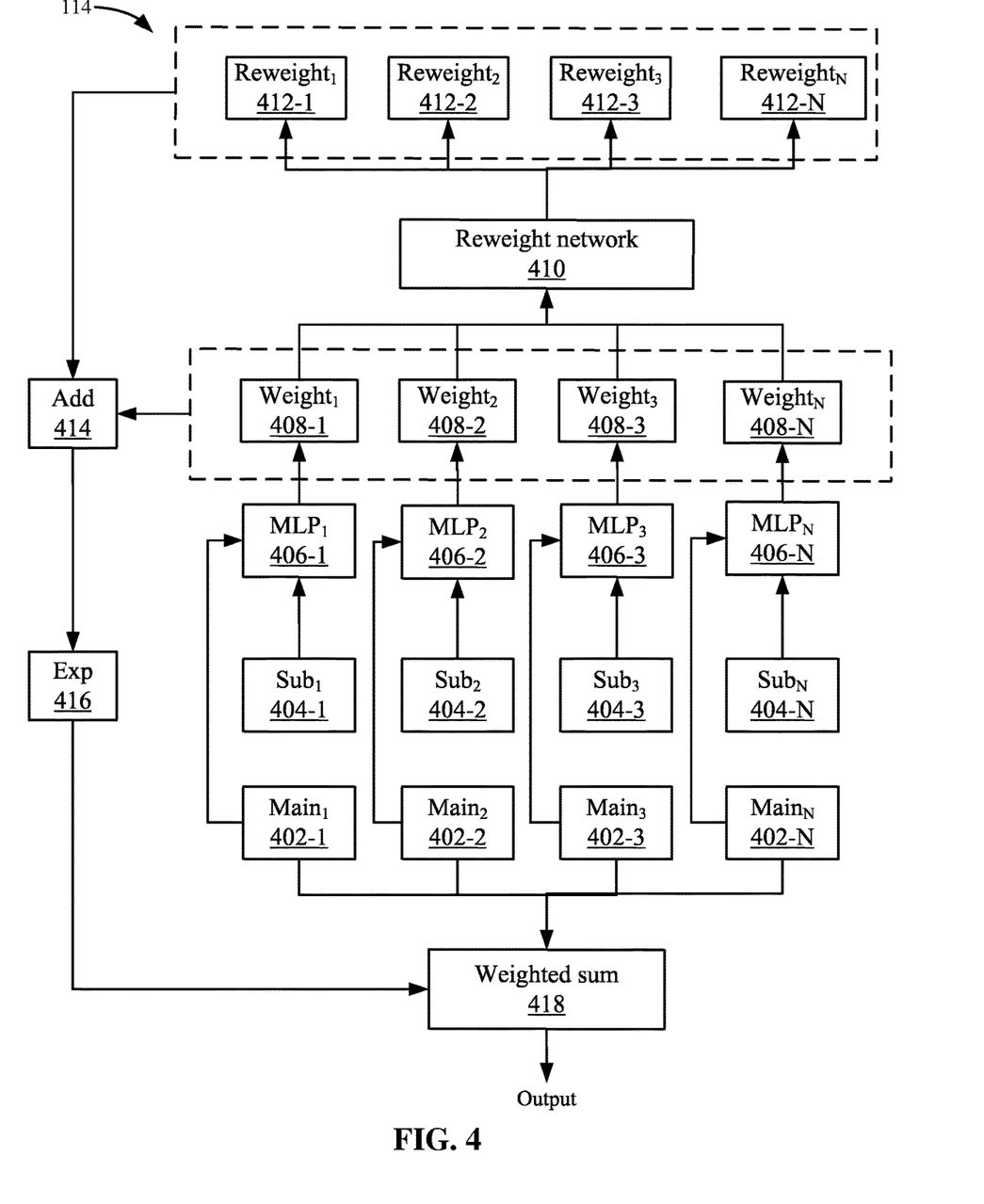
FIG. 4 depicts an example of an aggregator according to some embodiments.

FIG. 4 depicts an example of aggregator 114 according to some embodiments. Aggregator 114 may be referred to as a subsidiary intensity (SIN) aggregator. A subsidiary intensity aggregator may use subsidiary features and corresponding main features to capture fine-grain interests by generating weights on each respective main feature in the sequence of main features. As discussed above, aggregator 114 may have previously used only point-wise weights, which applied an intensity for a subsidiary feature only based on only that feature. This neglected sequence-wise relationships, such as user interests that can be based upon the sequence of subsidiary features or main inputs. As will be discussed in more detail, aggregator 114 may use a reweight network 410 that can characterize sequence-wise relationships of original weights 408 with reweight values 412. Then, point-wise original weights 408 and sequence-wise reweight values 412 can be used to analyze the sequential inputs.

Turning to the entire model in aggregator 114, a sequence of inputs is represented as maim feature 402-1, $main_2$ feature 402-2, $main_3$ feature 402-3 to $main_N$ feature 402-N. The sequence of inputs may be sequence of embeddings for behavior of a user account. One example of a sequence of inputs may be show identifiers for videos that were watched on video delivery system 106. In some examples, the sequential inputs may be represented by embeddings. In some embodiments, mains feature 402-1 may be embedding for a first video identifier (e.g., a show, movie, etc.), $main_2$ feature 402-2 is an embedding for a second video identifier, $main_3$ feature 402-3 is an embedding for a third video identifier, etc. Mains feature 402-1 may have been watched first by the user account, $main_2$ feature 402-2 was watched second, and then $main_3$ feature 402-3, etc. Accordingly, the sequence of behaviors is organized by a criterion, such as time.

Subsidiary features for the respective inputs are represented as subsidiary features 404-1, $subsidiary feature_2$ 404-2, $subsidiary feature_3$ 404-3 to $subsidiary feature_N$ 404-N. Each respective subsidiary feature 404 may be associated with a corresponding main feature 402. For example, subsidiary feature 404-1 may be based on main feature 402-1. For an aggregator 114, the same set of subsidiary features 404 may be used for each main feature 402. However, the number of subsidiary features 404 may vary for each main feature 402. Also, different aggregators 114 may use a different set of subsidiary features 404. In some embodiments, subsidiary features 404 may be configured as an X number of possible features. Then, each main feature 402 may be associated with one or more of the possible subsidiary features 404. For discussion purposes, a reference to a subsidiary feature 404 or subsidiary features 404 may be one or more subsidiary features. If a subsidiary feature 404 does not have a value, then that subsidiary feature 404 may not be included, represented as a 0 value, etc. For example, if a subsidiary feature 404 is watch time of the video, and the user account has not watched the video, then this subsidiary feature 404 may not be used, or be represented by a 0 value or another value. However, if the user account watched a specific video #1, subsidiary feature 404-1 may represent how many times the user account has watched video #1 or how many minutes the user account watched video #1. Also, subsidiary feature 404-2 may be a subsidiary feature for main feature 402-2. For example, if the user account watched a video #2 that is associated with main feature 402-2, subsidiary feature 404-2 may represent how many times the user account has watched video #2 or how many minutes the user account watched video #2. Other subsidiary features 404 may include values for main features 402. In some embodiments, subsidiary features 404 may be represented by embeddings, but can be represented by numerical numbers, such as a number between a range.

A subsidiary feature prediction network 406 analyzes subsidiary features 404 and main features 402 to generate original weights 408. Subsidiary feature prediction network 406 may include respective prediction networks $MLP_1$ 406-1, $MLP_2$ 406-2, $MLP_3$ 406-3 to $MLP_N$ 406-N, which analyze respective subsidiary features 404-1 to 404-N and main features 402 1-N. Each respective subsidiary feature 404 may be represented by a representation, such as an embedding. The embedding may represent a combination of any subsidiary features for the main feature. In some embodiments, each subsidiary feature prediction network 406 is the same in a single aggregator 114, which means subsidiary feature prediction networks 406 have the same parameters. This means each subsidiary feature prediction network 406 is configured to analyze the same subsidiary features 404 across the sequence of subsidiary features 404 (e.g., user watch minute, last watch till now). However, the subsidiary feature prediction networks may be different across different aggregators 114 that aggregate different user behavior sequences.

Each original weight 408 may be considered a point-wise weight in that the weight represents only the relevance of a respective subsidiary feature 404 to the respective main feature 402. That is, each subsidiary feature prediction network 406 may not consider other subsidiary features 404 in the sequence. In some embodiments, prediction network 406 may be a multilayer perceptron (MLP) network may analyze a respective subsidiary feature 404 and main feature 402, and output a corresponding original weight 408. For example, a subsidiary feature prediction network 406-1 analyzes subsidiary feature 404-1 and main feature 402-1, and outputs an original weight 408-1. Original weight 408-1 represents a respective weight for subsidiary feature 404-1 and main feature 402-1. Similarly, subsidiary feature prediction network 406-2 analyzes subsidiary feature 404-2 and main feature 402-2, and outputs an original weight 408-2. Original weight 408-2 represents a respective weight for subsidiary feature 404-2 and main feature 402-2. Respectively, subsidiary feature networks 406-1 to 406-N output original weights $weight_1$ 408-1, $weight_2$ 408-2, $weight_3$ 408-3 to $weight_N$ 408-N.

Instead of just using original weights 408 in aggregator 114, a reweight network 410 analyzes the sequence of original weights 408-1 to 408-N to generate reweight values 412-1 to 412-N. For example, reweight values include $reweight_1$ value 412-1, $reweight_2$ value 412-2, $reweight_3$ value 412-3 to $reweight_N$ value 412-N. Reweight values 412 represent adjusted weight values for respective original weights of $original weight_1$ 408-1, $original weight_2$ 408-2, $original weight_3$ 408-3 to $original weight_N$ 408-N.

Reweight network 410 adjusts original weights 408 by reviewing relationships in the sequence of original weights 408. The input to reweight network 410 is original weight values 408, which uses information separate from the embeddings for the subsidiary features 404. Original weight values 408 may have fewer dimensions than subsidiary features 404. For example, since the original weights 408 are typically an intensity value, original weights 408 may be one dimension and within a small range of values. However, since there may be a large number of subsidiary features 404, the values may be represented in multiple dimensions and be within a large possible range of values. Accordingly, reweight network 410 may analyze the relationships between the original weight values 408 in a more efficient manner compared to analyzing the embeddings for the subsidiary features 404. This is because extracting the relationship in a sequence of original weights 408 may be less complex than extracting relationships of multi-dimensional embeddings. For example, if the sequence has length of 100 subsidiary features 404. Then, the input to the reweight network 410 is a length of [100] values for original weight values 408. However, if a prediction network directly processed the subsidiary features, the input may be [100*embedding size of the subsidiary features]. As the embedding size is usually much larger, e.g., 128 dimensions for each embedding, the overall cost to process the subsidiary features would be much larger than using the weight values. As such, reweight network 410 may not need as complicated logic that may be needed to analyze a sequence of subsidiary features 404, which may require a recurrent neural network, convolutional neural network, etc. Rather, because original weight values 408 are being analyzed, reweight network 410 can analyze the sequential relationship by analyzing the value of original weights 408 and/or respective positions of original weights 408 in the sequence. Moreover, subsidiary features 404 introduce the subsidiary information into the reweighting process if used. That is, the subsidiary features 404 are information for each main feature 402. However, original weights 408 may be processed by prediction networks 406 to generate original weights 408, which may better represent the subsidiary features 404 for the purposes of processing in aggregator 114 because prediction networks 406 may extract more relevant information from subsidiary features 404 compared to just using the original values of subsidiary features 404.

Once determining reweight values 412, aggregator 114 uses reweight values 412 to generate an output for aggregator 114. Aggregator 114 may use different methods to generate the input. For example, aggregator 114 can combine reweight values 412 with original weights 408. In some embodiments, an add block 418 may combine reweight values 412 and original weights 408. The combination may be performed in different ways, such as by adding respective weights together or multiplying the weights together. For example, add block 414 may add weights 408-1 to reweight$_1$ value 412-1, add weight$_2$ 408-2 and reweight$_2$ value 412-2, and so on. The output of add block 412 may be a series of final weights where each final weight 1-N (not shown) corresponds to a subsidiary feature 404-1 to 404-N. Accordingly, respective original weights 408-1 to 408-N may be adjusted based on respective reweight values 412-1 to 412-N to generate final weights 1-N. Combining reweight values 412 with original weight values 408 may create an adjusted original weight value that considers the sequence of original weights. Although a combination is described, no combination may be performed. That is, reweight values 412 may only be used as the final weights instead of original weights 408. In this case, reweight values 412 may be an adjusted value of original weight values 408. Also, aggregator 114 may determine that original weights 408 can be used without any adjustment from reweight values 412, and skip using reweight values 412. In some cases, aggregator 114 may analyze the values of reweight values 412 to determine if the reweight values refine the original weights 408 by a threshold. If not, then aggregator 114 may determine using reweight values 412 are not needed. When reweight values 412 are skipped, aggregator 114 may change reweight values to zero values.

An exponential function (EXP) 416 may be used to make sure the final weights are not negative.

Aggregator 114 may then generate a combination of main features 402 using the final weights. For example, aggregator 114 may calculate a weighted sum 418, which may combine the main features 402-1 to 402-N using the intensities of the respective final weights. In some embodiments, a final weight$_1$ corresponds to a combination of original weight$_1$ 408-1 and reweight$_1$ value 412-1, and final weight$_1$ is applied to an embedding for main$_1$ feature 402-1 to generate a weighted embedding. Similarly, a final weight$_2$ corresponds to a combination of original weight$_2$ 408-2 and reweight$_2$ value 412-2, and final weight$_2$ is applied to an embedding for main$_2$ feature 402-2 to generate a weighted embedding. The process applies final weights to each respective main features 402 to generate weighted embeddings. Then, aggregator 114 calculates the weighted sum from the weighted embeddings, such as by adding all the weighted embeddings together. The output may be a representation for the input sequence of behavior main$_1$ 402-1 to main$_N$ 402-N. The weighted sum may be a fixed size and also may be the same number of dimensions as a main feature 402.

Reweight Network

Figure 5:
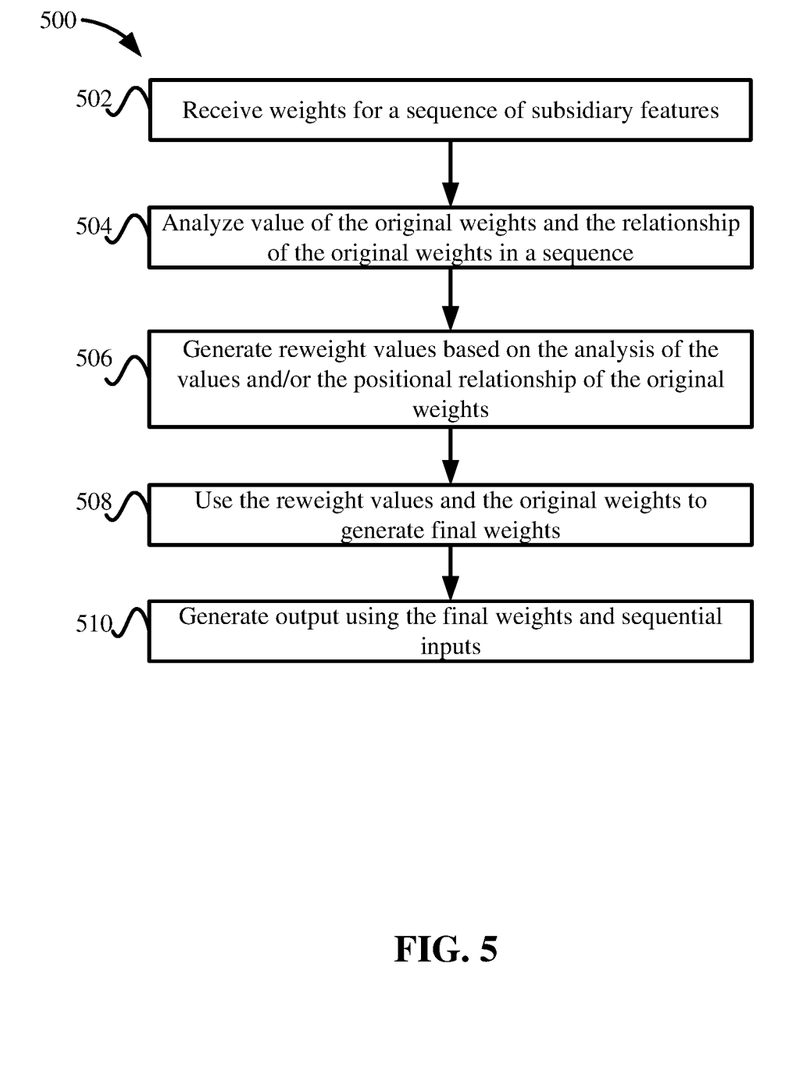
FIG. 5 depicts a simplified flowchart of a method for generating and using reweight values according to some embodiments.

The following will describe the reweight process in more detail. FIG. 5 depicts a simplified flowchart 500 of a method for generating and using reweight values 412 according to some embodiments. At 502, aggregator 114 receives weights for subsidiary features 408. At 504, aggregator 114 analyzes the value of original weights 408 and/or the positional relationship of original weights 408 in the sequence. At 506, aggregator 114 generates reweight values 412 based on the analysis based on the values of the original weights and/or the relationship of the original weights. At 508, aggregator 114 uses the reweight values 412 and original weights 408 to generate the final weights. Finally, at 510, aggregator 114 generates an output for the sequential input using the final weights.

Figure 6:
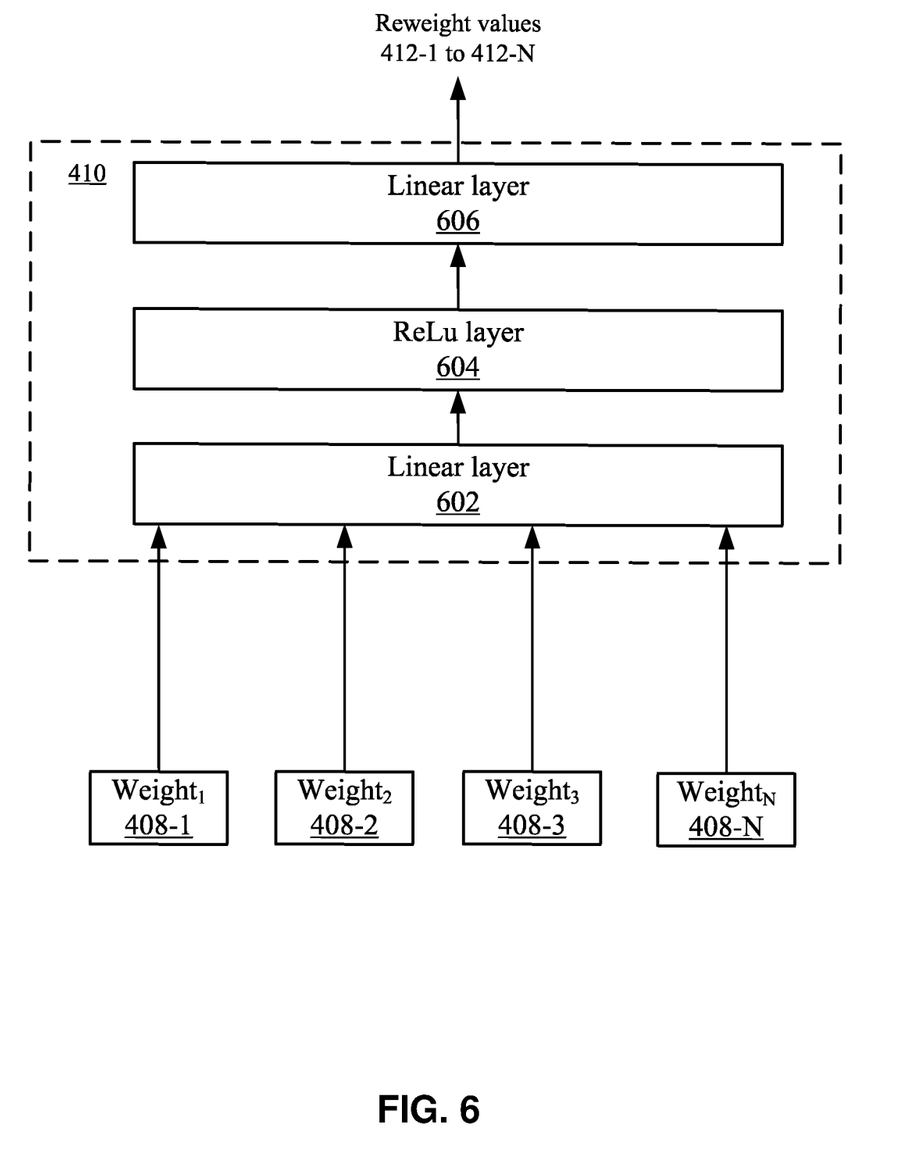
FIG. 6 depicts an example of a reweight network according to some embodiments.

Aggregator 114 may use different reweight networks 410 to perform the method described above. FIG. 6 depicts an example of reweight network 410 according to some embodiments. As discussed above, reweight network 410 may analyze the relationships between original weights 408. In some embodiments, reweight network 410 may be a multi-layer perceptron network. The multi-layer perceptron network may receive a sequence of original weights 408-1 to 408-N and can analyze the relationship between original weights 408-1 to 408-N to output a sequence of reweight values 412-1 to 412-N.

The multi-layer perceptron network may include multiple layers that include neurons. Each neuron may include a function that maps inputs to the output of each neuron. The neurons may be interconnected to analyze the relationship between original weights 408. Because original weights 408 are one-dimension, the complexity of the multi-layer perceptron network may be reduced compared to a network that would be required to analyze a sequence of subsidiary features 404. As mentioned before, the input parameters are reduced from [sequence length*embedding size] to [sequence length] when using original weights 408 instead of subsidiary features 404. A multi-layer perceptron may be only able to handle fixed-length inputs and the sequence of weights 408 may be padded based on the input sequences received per user account. For example, some user accounts may only have three inputs of behavior whereas some user accounts may have more up to the maximum length. The padding may either add input values, such as 0 values, at the end of the input sequence, or clip or remove elements that are above the maximum amount. Prediction network 410 may be configured to output the same dimension length of reweight values 412 as received for original weights 408. Each layer in prediction network 410 is thus configured to process the same sequence length to be able to output the same length.

In some embodiments, an alteration of a squeeze-and-excitation network may be used. A squeeze-and-excitation network may model the interdependencies between the inputs. For example, the squeeze-and-excitation network may use global information for the sequence of original weights 408 to selectively emphasize more important original weights 408 and suppress less important ones. Typically, the squeeze-and-excitation network may have the input size of [batch, width, depth, input dimension] for the image processing. However, for analyzing subsidiary features 404, prediction network 410 receives the input of [batch, sequence length, feature dimension] as the input. Feature dimension is "1" for one dimension here, but may be more than one dimension for subsidiary features 404. The typical squeeze-and-excitation network may first perform a squeeze operation that compresses each feature in the sequence to be one dimension. In prediction network 410, as weights 408 all have dimension of one, prediction network 410 may not perform the squeeze operation to compress the input. Rather, prediction network 410 performs an excitation step to extract relationships (e.g., fuse) from the features across different positions in the sequence. Additionally, the typical squeeze-and-excitation network may use a sigmoid function to convert the output to be in the range of [0, 1] while predication network 410 does not need to use this because aggregator 114 uses an exponential function 416 to perform a similar function.

In some embodiments, prediction network 410 may include a linear layer 602 that may apply a linear transformation to a sequence of original weights 408. The linear layer may be a linear projection, which may use a function similar to: y=Wx, where x is the input and W is the parameter number of the network. To show how linear layer 602 is simplified by processing original weight 408 instead of subsidiary features 404, suppose the output of the first linear layer has the size of 128. Then, the parameter W would be [128, input size]. Hence, the parameter number of W is reduced from [128, sequence length*embedding size] to [128, sequence length].

A non-linear (e.g., ReLu) layer 604 may apply a non-linear transformation to the output of linear layer 602. Although a ReLu layer may be used, other functions may be used to perform the non-linear transformation, such as a sigmoid function. The ReLu layer 604 may attempt to capture the relationships between original weights 408. For example, ReLu layer 604 may learn a non-linear interaction between original weights 408 that activates elements that have a value of greater than zero and learn a non-mutually exclusive relationship such that multiple original weights 408 are allowed to be emphasized. Accordingly, ReLu layer 604 may use a gating function to model the relationships between original weights 408. The gating function may active the elements with values greater than zero.

A linear layer 606 then processes the output of ReLu layer 604. Linear layer 606 may perform a linear projection to learn higher level semantics of the output of ReLu layer 604. The output of linear layer 606 may be reweight values 412. Although three layers are described, the number of linear layers and ReLu layers may vary. Accordingly, reweight network 410 has processed the sequence of weights 408-1 to 408-N and generated reweight values 412-1 to 412-N. Reweight network 410 generates reweight values 412-1 to 412-N that emphasize some weights 408 more when the interdependencies between original weights 408 indicate that these original weights 408 may be more important.

In some embodiments, the squeeze and excitation network calculates reweight values 412 as follows:

$$\text{reweight values}=\text{Clip}((W_2^{SE})\delta(W_1^{SE}\text{Pad(int)})),$$

where $\delta$ refers to the ReLu activation, $W_1^{SE} \in R^{T_{max} \times T_{max}}$ are the parameters (e.g., weight matrix) in linear layer 602, $W_2^{SE} \in R^{T_{max} \times T_{max}}$ is the parameters (e.g., weight matrix) in linear layer 606. The function Pad(int) is the padded input original weights 408 and clip function may limit the values to the number of original weights 408. In sum, reweight network 410 may perform an operation that is equivalent to multiplying the exponential reweight values 408 of intensity corrections for a sequence-wise reweighting of original weights 404 using:

$$\text{Exp(reweight+original)}=\text{Exp(reweight)} \odot \text{Exp(original weight)}.$$

The following will describe some simplified examples to show the generation of reweight values. In some embodiments, reweight network 410 can use the ranking of the values of weights to generate the reweight values. For instance, some weights 408 that may have very large values or very small values within the sequence may skew the results of the output. Accordingly, reweight network 410 may use the values in the sequence to generate more balanced values as the reweight values. For example, original weights 408 and reweight values 412 may be: Original weights=[1.5, 2.3, 1.7, 1.8], reweight values=[−1.5, −1.3, −1.9, −2.0]

In some embodiments, reweight values 412 may be generated based on the relationship among values of original weights 408. One advantage of using the reweight values is that the reweight values can emphasize the original weights that correspond to inputs that are important (e.g., watch history). Using the reweight values, the addition of the original weights and the reweight values is [0.0, 1.0, −0.2, −0.2]. The output of the exponential function is [1.0, 2.7, 0.8, 0.8]. In this case, the second input is considered the most important and emphasized by the reweight values. For example, reweight network 410 may analyze the values of original weights and determine that the second weight is more important than the first, third, and fourth original weights because the value of the second weight is larger than the values of the first, third, and fourth original weights. Also, the values of the first, third, and fourth original weights are somewhat close together, which may mean the second original weight is more important because it is not similar in value. Reweight network 410 may also adjust the magnitude of the original weights to avoid a weighted sum that is too large because it may be desirable that the weighted sum is not too large. This may avoid output value explosion as well as the gradient explosion that would greatly hurt the steady state of the model performance. That is, a very large weighted sum may skew the overall results of the output of main model 300 of FIG. 3 when combined with other values and also make the network parameters change a large amount during training. In the above case, the second weight is increased to emphasize the corresponding main feature, but to avoid a large weighted sum, the other original weights are lowered in value to deemphasize the corresponding main features. This causes the weighted sum to not explode in value.

In another example, the original weights are [0.03, 0.1, −0.1, 0.05], and reweight values are [0.2, 0.6, −0.4, 0.05]. The sum of the original weights and the reweight values are [0.23, 0.7, −0.5, 0.1], and the output of the exponential function is [1.3, 2.0, 0.6, 1.1]. In this case, small weights are increased to larger values. One problem with small weights is that the weighted sum may be small and become inconsequential in the output of main model 300.

Also, reweight network 410 may consider the position information in the input sequence. For example, reweight network 410 may assign the more recent behaviors in the sequence with a larger reweight value while assigning earlier behaviors smaller reweight values. In a simple example, the original weights 408 may be sorted by ascending order from the present to past. For example, original weights 408 and reweight values 412 may be: Original weights=[0.3, 0.4, 0.3, 0.3], reweight values=[0.2, 0.1, 0.0, −0.2]. The sum of the original weights and the reweight values is [0.5, 0.5, 0.3, 0.1], and the output of the exponential function is [1.6, 1.6, 1.3, 1.1].

In the above, a first position that has an original weight of 0.3 may be associated with the most recent behavior, 0.4 may be an original weight that may be associated with the second most recent behavior, and then 0.3, etc. Then, reweight values 412 are generated placing the highest importance on the most recent original weights 408. For example, reweight value 412 in the first position is 0.2, which is higher than the reweight of 0.1 in the second position. The third and fourth reweight values are 0.0 and −0.1 to deemphasize those original weights and also lower the output of the weighted sum. When reweight values 412 are added to original weight values 408, the reweight values 412 may have placed more emphasis on more recent original weights 408. For example, the first original weight has been increased to be equal to the second original weight, and the third and fourth original weights have been decreased to be less than the first original weight.

CONCLUSION

Accordingly, when using an on-line environment, subsidiary features can be used to adjust original weights 408 for the subsidiary features. However, given the short amount of time in which a recommendation can be generated, reweight network 410 allows relationships between the sequential inputs to be used, but in an efficient manner. This improves the efficiency of aggregator 114 when generating the output.

System

Figure 7:
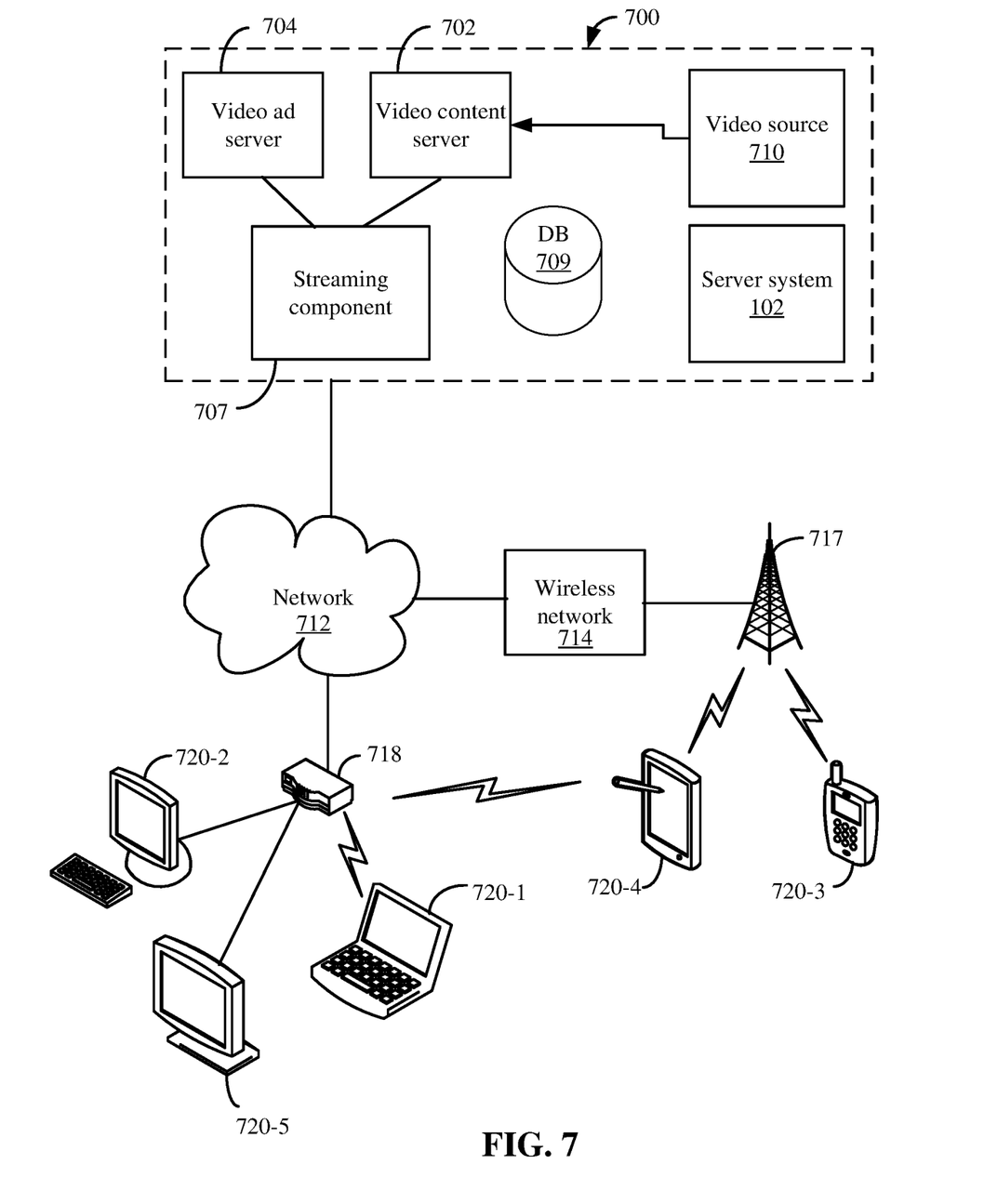
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
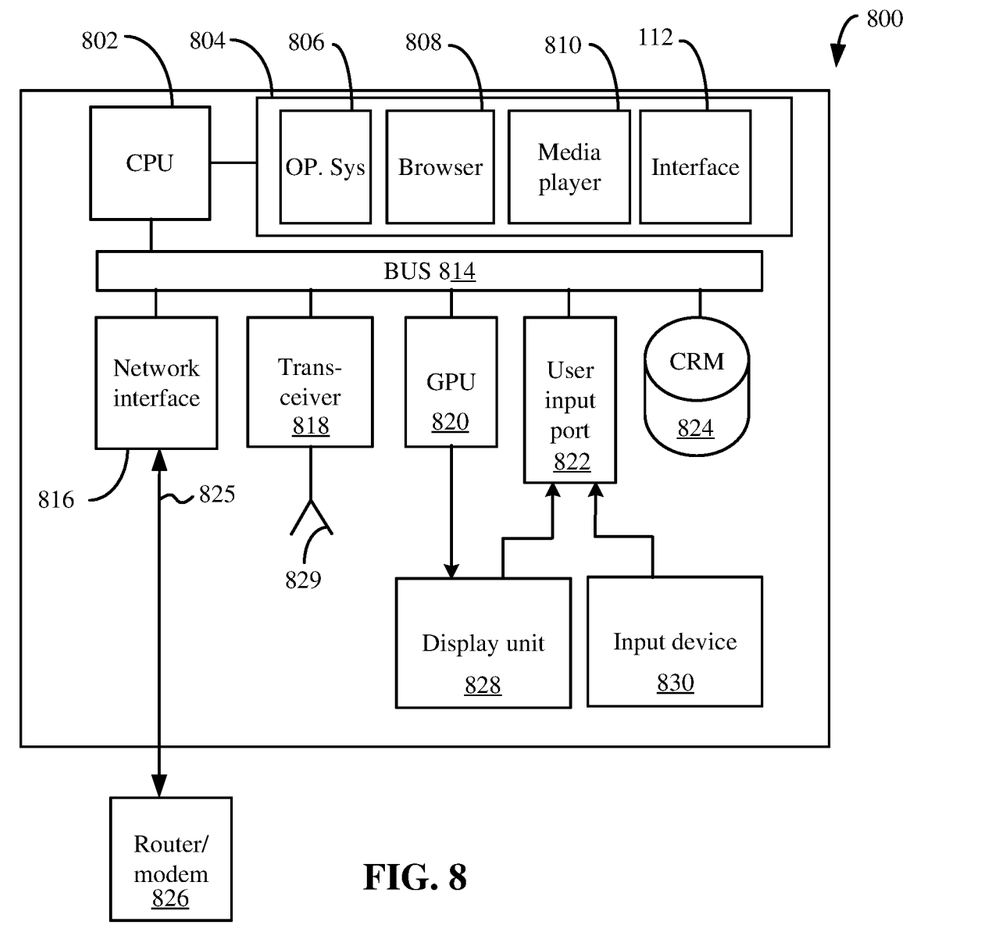
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include interface 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

EXAMPLE EMBODIMENTS

In some embodiments, a method comprising: receiving, by a computing device, a sequence of subsidiary features that are associated with a sequence of main features, wherein a subsidiary feature provides subsidiary information for a main feature; generating, by the computing device, a sequence of first weights for the sequence of subsidiary features, wherein a first weight in the sequence of first weights is generated based on a respective subsidiary feature; processing, by the computing device, the sequence of first weights to generate a sequence of second weights, wherein the processing uses relationships in the sequence of first weights to generate values of the second weights; and using, by the computing device, the sequence of second weights to process the sequence of main features to generate an output for the sequence of main features.

In some embodiments, each main feature in the sequence of main features is associated with a respective subsidiary feature in the sequence of subsidiary features.

In some embodiments, a value for each subsidiary feature in the sequence of subsidiary features is based on user behavior for a user account.

In some embodiments, generating the sequence of first weights comprises: analyzing an individual main feature to generate a first weight for the individual main feature.

In some embodiments, analyzing the individual main feature analyzes information separate from the other main features in the sequence of main features.

In some embodiments, generating the sequence of first weights comprises: inputting each subsidiary feature in the sequence of subsidiary features and each respective main feature in the sequence of main features into a respective prediction network; and outputting each first weight in the sequence of first weights from the respective prediction network.

In some embodiments, processing the sequence of first weights comprising: inputting the sequence of first weights into a prediction network; and processing the sequence of first weights using relationships in the sequence of first weights to generate the sequence of second weights.

In some embodiments, processing the sequence of first weights using the relationships comprises: determining a relationship between a first instance of a first weight and other instances of first weights; and generating a value of the second weight based on the relationship of the first weight and the other instances of first weights.

In some embodiments, the relationships in the sequence of first weights comprises relationships between values of the first weights.

In some embodiments, the relationships in the sequence of first weights comprise relationships between positions of the first weights in the sequence of first weights.

In some embodiments, processing the sequence of first weights uses information separate from the sequence of subsidiary features.

In some embodiments, using the sequence of second weights to process the sequence of main features comprises: applying a second weight in the sequence of second weights to a corresponding main feature in the sequence of main features.

In some embodiments, using the sequence of second weights to process the sequence of main features comprises: combining the sequence of second weights with the sequence of first weights to generate a sequence of third weights; and applying the sequence of third weights to the sequence of main features.

In some embodiments, using the sequence of second weights to process the sequence of main features comprises: using the sequence of second weights to generate a weighted sum of the sequence of main features.

In some embodiments, the output for the sequence of main features is a fixed length representation of the sequence of main features.

In some embodiments, first weights in the sequence of first weights are a smaller representation than subsidiary features in the sequence of subsidiary features.

In some embodiments, a non-transitory computer-readable storage medium containing instructions, that when executed, control a computer system to be operable for: receiving a sequence of subsidiary features that are associated with a sequence of main features, wherein a subsidiary feature provides subsidiary information for a main feature; generating a sequence of first weights for the sequence of subsidiary features, wherein a first weight in the sequence of first weights is generated based on a respective subsidiary feature; processing the sequence of first weights to generate a sequence of second weights, wherein the processing uses relationships in the sequence of first weights to generate values of the second weights; and using the sequence of second weights to process the sequence of main features to generate an output for the sequence of main features.

In some embodiments, a method comprising: receiving, by a computing device, a sequence of subsidiary features that are associated with a sequence of main features, wherein a subsidiary feature provides subsidiary information for a main feature; inputting, by the computing device, the sequence of subsidiary features into one or more first prediction networks to generate a sequence of first weights for the sequence of subsidiary features, wherein each first weight is based on a respective subsidiary feature; processing, by the computing device, the sequence of first weights in a second prediction network to generate a sequence of second weights, wherein the processing uses relationships in the sequence of first weights to generate values of the second weights; and outputting, by the computing device, the sequence of second weights for application to the sequence of main features.

In some embodiments, each subsidiary feature in the sequence of subsidiary features is inputted into a respective first prediction network that analyzes the respective subsidiary feature.

In some embodiments, the relationships in the sequence of first weights include positional relationships of the sequence of first weights or values of the first weights.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    receiving, by a computing device, a first input of a sequence of subsidiary features and a second input of a sequence of main features, wherein a subsidiary feature provides subsidiary information for a main feature, the subsidiary feature including a first value that is different from a second value of the main feature;
    generating, by the computing device, a sequence of first weights for the sequence of subsidiary features, wherein a first weight in the sequence of first weights is generated based on a respective first value of the subsidiary feature;
    extracting, by the computing device, a sequential relationship of first weights based on the sequence of first weights;
    processing, by the computing device, the sequence of first weights to generate a sequence of second weights using the sequential relationship of first weights; and
    using, by the computing device, the sequence of second weights to apply the respective second weight to the respective second value for the main feature in the sequence of main features to generate an output for the sequence of main features.

2. The method of claim 1, wherein each main feature in the sequence of main features is associated with a respective subsidiary feature in the sequence of subsidiary features.

3. The method of claim 1, wherein a value for each subsidiary feature in the sequence of subsidiary features is based on user behavior for a user account.

4. The method of claim 1, wherein generating the sequence of first weights comprises:
    analyzing an individual main feature to generate a first weight for the individual main feature.

5. The method of claim 4, wherein analyzing the individual main feature analyzes information separate from the other main features in the sequence of main features.

6. The method of claim 1, wherein generating the sequence of first weights comprises:
    inputting each subsidiary feature in the sequence of subsidiary features and each respective main feature in the sequence of main features into a respective prediction network; and
    outputting each first weight in the sequence of first weights from the respective prediction network.

7. The method of claim 1, wherein processing the sequence of first weights comprising:
    inputting the sequence of first weights into a prediction network; and
    processing the sequence of first weights using relationships in the sequence of first weights to generate the sequence of second weights.

8. The method of claim 7, wherein processing the sequence of first weights comprises:
    determining the sequential relationship between a first instance of a first weight and other instances of first weights; and
    generating a value of the second weight based on the sequential relationship of the first weight and the other instances of first weights.

9. The method of claim 1, wherein the sequential relationship in the sequence of first weights comprises relationships between values of the first weights.

10. The method of claim 1, wherein the sequential relationship in the sequence of first weights comprise relationships between positions of the first weights in the sequence of first weights.

11. The method of claim 1, wherein processing the sequence of first weights uses information separate from the sequence of subsidiary features.

12. The method of claim 1, wherein using the sequence of second weights to process the sequence of main features comprises:
applying a second weight in the sequence of second weights to a corresponding main feature in the sequence of main features.

13. The method of claim 1, wherein using the sequence of second weights to process the sequence of main features comprises:
combining the sequence of second weights with the sequence of first weights to generate a sequence of third weights; and
applying the sequence of third weights to the sequence of main features.

14. The method of claim 1, wherein using the sequence of second weights to process the sequence of main features comprises:
using the sequence of second weights to generate a weighted sum of the sequence of main features.

15. The method of claim 1, wherein the output for the sequence of main features is a fixed length representation of the sequence of main features.

16. The method of claim 1, wherein first weights in the sequence of first weights are a smaller representation than subsidiary features in the sequence of subsidiary features.

17. A non-transitory computer-readable storage medium containing instructions, that when executed, control a computer system to be operable for:
receiving a first input of a sequence of subsidiary features and a second input of a sequence of main features, wherein a subsidiary feature provides subsidiary information for a main feature, the subsidiary feature including a first value that is different from a second value of the main feature;
generating a sequence of first weights for the sequence of subsidiary features, wherein a first weight in the sequence of first weights is generated based on a respective first value of the subsidiary feature;
extracting a sequential relationship of first weights based on the sequence of first weights;
processing the sequence of first weights to generate a sequence of second weights using the sequential relationship of first weights; and
using the sequence of second weights to apply the respective second weight to the respective second value for the main feature in the sequence of main features to generate an output for the sequence of main features.

18. A method comprising:
receiving, by a computing device, a first input of a sequence of subsidiary features and a second input of a sequence of main features, wherein a subsidiary feature provides subsidiary information for a main feature, the subsidiary feature including a first value that is different from a second value of the main feature;
inputting, by the computing device, the sequence of subsidiary features into one or more first prediction networks to generate a sequence of first weights for the sequence of subsidiary features, wherein each first weight is based on a respective first value of the subsidiary feature;
processing, by the computing device, the sequence of first weights in a second prediction network to generate a sequence of second weights, wherein the processing extracts a sequential relationship of first weights based on the sequence of first weights and uses the sequential relationship to generate of the sequence of second weights; and
outputting, by the computing device, the sequence of second weights for application to the sequence of main features.

19. The method of claim 18, wherein each subsidiary feature in the sequence of subsidiary features is inputted into a respective first prediction network that analyzes the respective subsidiary feature.

20. The method of claim 18, wherein the sequential relationship of the sequence of first weights include positional relationships of the sequence of first weights or values of the first weights.

* * * * *